(12) United States Patent
Saxena

(10) Patent No.: US 7,540,029 B1
(45) Date of Patent: May 26, 2009

(54) METHODS AND SYSTEMS FOR REDUCING THE SPREAD OF FILES ON A NETWORK

(75) Inventor: Tushar Saxena, Lexington, MA (US)

(73) Assignees: BBN Technologies Corp., Cambridge, MA (US); Verizon Corporate Services Group, Inc., New York, NY (US)

( * ) Notice: Subject to any disclaimer, the term of this patent is extended or adjusted under 35 U.S.C. 154(b) by 977 days.

(21) Appl. No.: 10/826,620

(22) Filed: Apr. 16, 2004

Related U.S. Application Data

(60) Provisional application No. 60/463,389, filed on Apr. 16, 2003.

(51) Int. Cl.
*G08B 23/00* (2006.01)
(52) U.S. Cl. ........................................ 726/23
(58) Field of Classification Search ........................ None
See application file for complete search history.

(56) References Cited

U.S. PATENT DOCUMENTS 6,057,892 A * 5/2000 Borer .......................... 348/699
6,279,113 B1 * 8/2001 Vaidya ......................... 726/23

* cited by examiner

*Primary Examiner*—Brandon S Hoffman

(57) ABSTRACT

Methods and systems can reduce the spread of computer files or data on a network by obtaining and tracking times of arrival for chunks of data transmitted on the network. The times of arrival for a node can be transformed into time-series and periodograms computed from the time-series. Successive periodograms can be compared to determine changes in the strongest peaks of the periodograms. If a new peak is identified, a search for the occurrence of the peak in previous periodograms can be conducted. If no peak having a matching frequency is found, a search for the peak in the periodograms for neighboring nodes can be performed. If matching peaks are found, the associated data stream can be classified. Predictions of the timing and length of associated data packets can be used to randomly interrupt transmission of associated data packets resulting in reducing the spread of the classified data stream.

21 Claims, 3 Drawing Sheets

METHODS AND SYSTEMS FOR REDUCING THE SPREAD OF FILES ON A NETWORK

RELATED APPLICATIONS

This application claims priority to, and incorporates by reference, the entire disclosure of U.S. Provisional Patent Application No. 60/463,389, filed on Apr. 16, 2003. This application is co-pending with a related patent application entitled "Methods and Systems for Tracking File Routing on a Network", by the same inventor and having assignee in common, filed concurrently herewith and incorporated by reference herein in its entirety.

GOVERNMENT INTEREST

The disclosed methods and systems were developed with support from the Defense Advanced Research Projects Agency; contract number MDA972-01-C-0080. The United States Government may have certain rights in the disclosed systems and methods.

FIELD

The methods and systems relate generally to communication networks, and more particularly to methods and systems for monitoring data transmitted over such networks.

BACKGROUND

Communication networks typically can include a number of interconnected communication devices. Connections among the devices in some communication networks are accomplished through physical wires or optical links. Such networks can be referred to as "wired" networks. Connections among other devices in other communication networks can be accomplished through radio, infrared, or other wireless links. Such networks can be referred to as "wireless" networks.

Increasingly, network users can experience receiving unwanted communication messages. While some unwanted messages can be benign, e.g., advertisements, the amount of unwanted traffic can consume valuable resources. Additionally, some unwanted messages, e.g., computer worms and viruses, can maliciously destroy other data at a receiving node and/or disable the operation of the node, while causing the node to forward the unwanted message to further unsuspecting nodes. Methods are known in the art for identifying and blocking receipt of some unwanted messages, e.g., virus scanning software. Generally, such methods include analyzing the contents of such messages.

Communication messages (e.g., data packets) sent across communication networks can be intercepted. Intercepted messages can yield valuable information and the process of intercepting and analyzing messages can be referred to as "traffic analysis". In general, traffic analysis can seek to understand something about the message traffic on a network by observing the traffic and analyzing that traffic to extract information. However, to guard against unwanted traffic analysis, messages can be typically encrypted. For example, both the content and the destination of a message can be obscured through encryption.

U.S. patent application Ser. No. 10/212,324 entitled "Encoding Signals to Facilitate Traffic Analysis", incorporated by reference herein in its entirety, describes methods and systems that can acquire information about communication among nodes in a network by intercepting chunks of data in the network by a tap located among the nodes in the network. Characteristic information about the intercepted chunks of data can be obtained. The characteristic information can include times of arrival of the chunks of data at the tap and identifiers of the source nodes that sent the chunks of data. A signal can be constructed to represent the characteristic information over time.

U.S. Pat. No. 7,359,966 entitled "Methods and Systems for Passive Information Discovery Using Lomb Periodogram Processing", incorporated by reference herein in its entirety, describes methods and systems for processing communications signals in a network that can obtain time of arrival information for chunks of data in the network and construct a signal to represent the time of arrival of the information. The signal can consist of data that is non-uniformly spaced. The system can process the signal using a Lomb technique to obtain periodicity information about the signal.

The information obtained using the above described methods and systems can be based on the time of arrival for chunks of data and not on the contents of the data. Thus, the information can be available for encrypted messages. Methods and systems can be developed to aid in identifying unwanted messages using this information and further to dampen, slow down or otherwise reduce the spread of the unwanted messages on the network.

SUMMARY

Methods and systems can reduce the spread of computer files or data on a network by obtaining and tracking times of arrival for chunks of data transmitted on the network. The times of arrival for a node can be transformed into time-series and periodograms can be computed from the time-series. Successive periodograms can be compared to determine changes in the strongest peaks of the periodograms. If a new peak is identified, a search for the occurrence of the peak in previous periodograms over a predetermined time period can be conducted. If no peak having a matching frequency is found within the searched periodograms, the peak can be marked for further analysis. A search for marked peaks in the periodograms for neighboring nodes can be performed. If marked peaks having matching frequencies are found, the associated data stream can be classified. Predictions of the timing and length of associated data packets can be used to randomly interrupt transmission of associated data packets resulting in reducing the spread of the classified data stream.

In one embodiment, a method of reducing spread of data on a network can include obtaining a spectral analysis of times of arrival of data packets at receiving nodes of the network from sending nodes of the network over predetermined time periods. For each pair of sending node and receiving node, the method can include marking transmissions of data packets for the pair as marked transmissions when the spectral analysis indicates peak frequencies associated with the marked transmissions are different from peak frequencies associated with others of the transmissions for the pair over a window of a predetermined number of time periods. When marked transmissions from pairs having at least one common sending node and/or one common receiving node and from within a specified number of windows of each other have corresponding frequencies, the transmissions can be marked as interruptible transmissions. Timing and length information for future data packets corresponding to the interruptible transmissions can be estimated and traffic of the future data packets can be interrupted based on the estimates.

Obtaining a spectral analysis can include tracking times of arrival data, transforming the times of arrival data into time-series, parsing the time-series into windows, and obtaining Lomb periodograms for the windows. Estimating can include applying a Hidden Markov Model technique for classifying the interruptible transmissions as belonging to one of a plurality of classes of transmissions having determinable characteristics. Interrupting can include randomly removing data packets for a specified time. After the specified time, the method can determine if a further spectral analysis of times of arrival of data packets since beginning the interrupting indicates the peak frequencies associated with the marked transmissions. When the further spectral analysis indicates said peak frequencies, the method can return to estimating based on the further spectral analysis associated with the marked transmissions.

In one embodiment, a method of reducing spread of data on a network can include obtaining, at a receiver node of the network, periodograms based on times of arrival of data packets from a sender node of the network, comparing peak frequencies in successive ones of the periodograms for the sender node to determine if one of the periodograms includes a peak above a threshold at a frequency different from the peak frequencies in a preceding periodogram from the sender node, determining if at least one peak above the threshold at the frequency occurs in one of a predetermined number of previous periodograms for the sender node, determining if the at least one peak at the frequency occurs in at least one of a specified number of periodograms obtained at the receiver node for other sender nodes of the network, estimating timing and length information for future data packets corresponding to the frequency when the peak at the frequency does not occur in one of a predetermined number of previous periodograms for the sender node and when the at least one peak at the frequency does occur in at least one of said specified number of periodograms obtained at the receiver node for other sender nodes of the network, and interrupting traffic of the future data packets corresponding to that frequency based on the estimating.

Obtaining the periodograms can include tracking times of arrival data, transforming the times of arrival data into time-series, parsing the time-series into the windows, and obtaining Lomb periodograms for the windows. Estimating can include using a Hidden Markov Model to classify a data stream for the at least one peak at the frequency based on said periodograms. Interrupting traffic can include randomly removing data packets for a specified time, determining, after the specified time, if the at least one peak at the frequency occurs in at least one additional periodogram based on times of arrival of data packets since beginning the interrupting of traffic, and returning to estimating based on including the additional periodograms with the specified number of periodograms when the at least one peak at the frequency occurs in at least one additional periodogram.

In one embodiment, a method of reducing spread of data on a network can include obtaining, at a router node of the network, periodograms based on times of arrival of data packets from a sender node of the network, comparing successive periodograms for the sender node to determine when at least one new peak above a threshold is present in one of said periodograms, determining if the new peak occurs in one of a predetermined number of previous periodograms for the sender node, determining if the new peak occurs in at least one of a specified number of periodograms obtained at the router node for other sender nodes of the network, estimating timing and length information for future data packets corresponding to the new peak when the new peak does not occur in one of a predetermined number of previous periodograms for the sender node and when the new peak does occur in at least one of said specified number of periodograms obtained at the router node for other sender nodes of the network, and interrupting traffic of the data packets corresponding to the new peak based on the estimation.

In one aspect, interrupting traffic can include randomly removing data packets for a specified amount of time. To obtain the periodograms, the method can track times of arrival data, transform the times of arrival data into time-series, parse the time-series into windows, and obtain Lomb periodograms for the windows. Estimating can include using a Hidden Markov Model to classify a data stream for the new peak based on the periodograms.

In one embodiment, a method of classifying disruptive data packet traffic flow on a network can include obtaining at a router, periodograms based on times of arrival of for data packets from nodes of the network, comparing successive periodograms for each of the nodes to determine when at least one new peak above a threshold is present in one of the periodograms for one of the nodes, marking the new peak as a suspicious peak when said new peak does not occur in one of a predetermined number of previous periodograms for that node, determining if the suspicious peak occurs in at least one of a specified number of periodograms obtained at the router for other nodes of the network, determining if the suspicious peak occurs in at least one of a specified number of periodograms obtained at other routers for that one node, and providing a signal to classify traffic flow corresponding to the suspicious peak as disruptive traffic flow when the suspicious peak occurs at least in one of the specified number of periodograms obtained at the router for others of the nodes and in at least one of the specified number of periodograms obtained at other routers for that one node.

In one embodiment, a computer-readable medium can contain instructions for controlling a processor to classify disruptive data packet traffic flow, by obtaining at a router, periodograms based on times of arrival of the data packets from nodes of the network, comparing successive periodograms for each of the nodes to determine when at least one new peak above a threshold is present in one of the periodograms for one of the nodes, marking the one new peak as a suspicious peak when the new peak does not occur in one of a predetermined number of previous periodograms for that one node, determining if the suspicious peak occurs in at least one of a specified number of periodograms obtained at the router for other nodes of the network, determining if the suspicious peak occurs in at least one of a specified number of periodograms obtained at other routers for that one node, and providing a signal to classify traffic flow corresponding to the suspicious peak as disruptive traffic flow when the suspicious peak occurs either in one of the specified number of periodograms obtained at the router for others of the nodes, or in at least one of the specified number of periodograms obtained at other routers for that one node.

In one aspect, the computer-readable medium can contain instructions for controlling the processor to obtain the periodograms by tracking times of arrival data, transforming the times of arrival data into time-series, parsing the time-series into windows, and obtaining Lomb periodograms for the windows. The instructions can include instructions to provide a signal to classify traffic flow by using a Hidden Markov Model. The instructions for controlling the processor to interrupt can include instructions to randomly remove data packets for a specified time, determine, after that specified time, if the at least one peak at the frequency occurs in at least one additional periodogram based on times of arrival of data packets since beginning the interrupting, and returning to estimating based on including the additional periodograms with the specified number of periodograms when the at least one peak at the frequency occurs in the at least one additional periodogram.

In one embodiment, a computer program can be disposed on computer-readable medium for reducing spread of data on a network. The computer program can include instructions for causing a processor to obtain a spectral analysis of times of arrival of data packets at receiving nodes of the network from sending nodes of the network over predetermined time periods. For each pair of sending node and receiving node, transmissions of data packets for said pair can be marked when the spectral analysis indicates peak frequencies associated with the marked transmissions are different from peak frequencies associated with others of the transmissions for the pair over a window of a predetermined number of said time periods. The marked transmissions can be further marked as interruptible transmissions when marked transmissions from pairs of sending/receiving nodes having at least one of a common sending node and a common receiving node and within a specified number of said windows have corresponding frequencies. The instructions can cause the processor to estimate timing and length information for future data packets corresponding to the interruptible transmissions, and to interrupt traffic of the future data packets based on the estimated information.

The instructions to obtain a spectral analysis can include instructions to track times of arrival data, transform the times of arrival data into time-series, parse the time-series into the windows, and obtain Lomb periodograms for the windows. The instructions to estimate can include instructions to apply a Hidden Markov Model technique to classify the interruptible transmissions as belonging to one of a plurality of classes of transmissions having determinable characteristics. The instructions to interrupt can include instructions to randomly remove data packets over a specified time, and determine, after that specified time, if a further spectral analysis of times of arrival of data packets since beginning the interruption indicates further peak frequencies associated with the marked transmissions. The computer program instructions to interrupt can include instructions to repeat the instructions to estimate based on the further spectral analysis when the further spectral analysis indicates that peak frequencies associated with the marked transmissions do occur.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

Figure 1:
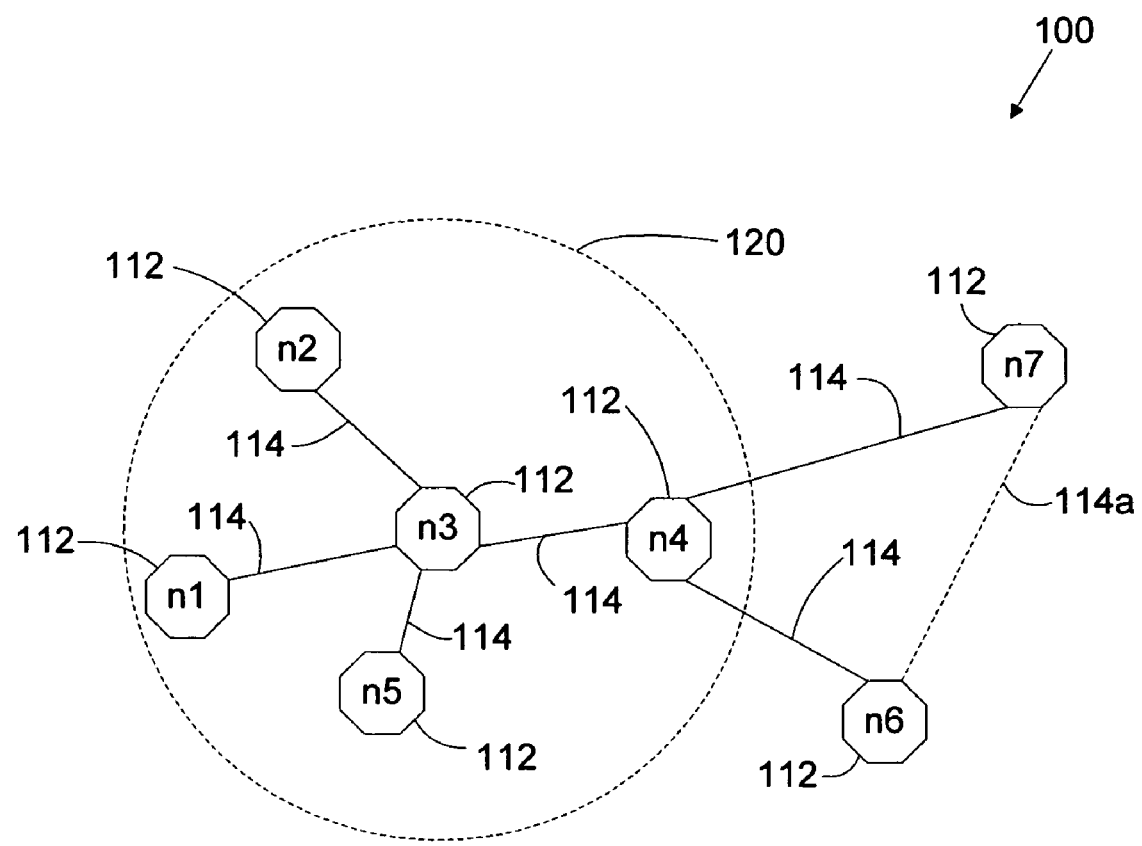
FIG. 1 illustrates a block diagram of an exemplary communication network.

Referring to FIG. 1, there is shown an exemplary network 100. The network 100 can include a number of network nodes 112 connected by a number of network links 114. The network 100 can also include one or more network nodes that serve as routers. For the exemplary embodiment of FIG. 1, network 100 can include seven nodes 112 connected in a particular configuration, with nodes n3-n6 serving as routers. The illustrated configuration can be understood to be exemplary, and other configurations can be contemplated that can include varying numbers and configurations of nodes 112, links 114, and/or routers.

Network nodes 112 can be configured to send and/or receive information according to a communications protocol, such as TCP/IP. Although not specifically shown, some nodes 112 can be configured to provide a route for information to a specified destination. Other nodes 112 can be configured to send the information according to a previously-determined route. The network nodes 112 can communicate via discrete "chunks" of data that can be transmitted by "senders" 112. The chunks can include separate pieces of data and/or data elements that extend over a period of time. A chunk can be individually detectable or distinguishable. For example, router nodes n3-n6 can determine when a chunk starts and/or ends. A chunk of data need not exactly correspond to a packet of data. A chunk may represent part of a packet (e.g., a fragment or an Asynchronous Transfer Mode (ATM) cell of certain protocol description units), or multiple packets (e.g., two packets concatenated).

A sender node 112 can be understood herein to be the most recent node 112 to transmit a particular chunk. As an example, node n1 of FIG. 1 can originate a chunk and forward the chunk to node n4 of FIG. 1 via router node n3 of FIG. 1. For the exemplary configuration of FIG. 1, router node n3 can intercept the chunk as it is transmitted from mode n1 to node n4. Thus, node n1 and/or n3 can be considered a sender node.

Network links 114 can include electronic links (e.g., wires or coaxial cables), optical links (e.g., fiber optic cables), and/or wireless links. In a wired network 100, the links 114 can provide a connection between two nodes 112 (e.g., nodes n1 and n3). Router nodes, e.g., node n3, can be a part of the links 114 and can observe the information carried on them. Routers n3-n6 can include devices that can intercept chunk transmissions on the network 100 at a physical layer, a link layer, a network layer, or at higher layers of the network 100 being monitored. For example, router n3 can include a physical connection to a corresponding link 114 between nodes n1 and n4 and circuitry to detect chunks of data on the link 114. The layer at which interceptions occur can be determined by those skilled in the art, and can be chosen based on knowledge of, and access to, the network links 114.

The router nodes can include, for example, a transceiver for sensing the chunks of data and can also include other circuitry (e.g., clock circuitry) for determining times of arrival and/or duration of the chunks. The router nodes can include a processor for computing other information associated with the chunks, such as information contained within a header of the chunk of data (e.g., the identity of a sending node 112 and/or a receiving node 112).

In the example of FIG. 1, router node n3 can observe traffic on the link 114 between nodes n1, n2, n4 and n5. Router node n3 can record information about the chunks that it observes in a "tracefile." A tracefile can contain information for observed chunks, and accordingly, can be understood to be an associated grouping of such data, where such data can be associated and/or grouped using a variety of mechanisms and/or schemes. For example, the information can include the time a chunk is/was observed and the identity of the sender node(s) 112 of the chunk. The identity of the sender node(s) 112 can include, for example, the exchange point address of an Internet Protocol security (IPsec) gateway, the upstream or downstream transmitter on the point-to-point link 114, or information such as "the same sender node 112 as the one that also transmitted [specified other] chunks." If available, the tracefile can also include additional information about the length or duration of the chunk, the destination node 112, or information concerning the contents of a chunk. In addition, available information can include the location of a router node along the link 114 relative to the nodes 112 at either end of the link 114, e.g., nodes n1 and n4.

It can be understood that errors can occur in the information observed by router nodes n3-n6. For example, router node n3 can mistakenly believe it has seen a chunk when no chunk was transmitted due to bit errors on network 100. Such error events, including the false transmission detection of the previous example, or missed transmissions, or misclassification of a sender node 112, can be viewed as adding noise to the signals generated by the router nodes n3-n6. Other sources of noise in the signal generated by the router nodes n3-n6 can include interference from other signals (e.g., packets belonging to another flow, or jitter in timing due to sharing of a bottleneck among multiple flows).

Router nodes n3-n6 can listen passively and not participate in the monitored network 100 at the Media Access Control (MAC) (or higher) layers. Such passive listening can be referred to as covert information collection. In some cases, for example with 802.3, or 802.11b Local Area Networks (LANs), the router nodes n3-n6 can snoop at the MAC layer and extract some information about higher layer protocols. In other networks, such as Synchronous Optical Networks (SONET), the information about the MAC or higher layer protocols can be limited, or unavailable.

Although FIG. 1 illustrates multiple router nodes, network 100 can include one or more router nodes, which can be interconnected. Router nodes can work independently using purely local information. Distributed algorithms and/or processing schemes can allow sharing of information among router nodes. In such a case, the router nodes can have a globally synchronized clock that allows information from multiple router nodes to be combined. A clock resolution of the router nodes n3-n6 can be finer than the data sampling resolution of the router nodes n3-n6, so that information about transmissions (e.g., the start time, duration, inter-transmission gap, and even the presence of short transmissions) can be obtained without missing some of the information.

In addition, a router node (or a network of router nodes) can store the detected transmissions for an amount of time such that information concerning longer duration events can be obtained. For example, to determine the round-trip time of a transport layer flow, the history stored at router node n3 can be equal to or greater than one roundtrip time. The total volume of data stored can depend on the capacity of the links 114 to the router node n3 and a maximum roundtrip time of flows seen on the links 114. Router nodes n3-n6 can assign a unique identifier to each sender node 112. For example, the identifier can be based on the address of the IPsec gateway, though other identifiers can be assigned by router nodes n3-n6.

It can be understood that network 100 can include a wireless network. In a wireless network 100, nodes 112 can communicate via wireless transmission, including point-to-point, broadcast, and/or other known wireless transmission methodologies. Sender nodes 112 can transmit using various types of wireless physical layers, such as terrestrial Radio Frequency (RF), satellite bands, and/or free space optical. In a wireless network, nodes 112 can include radio routers and/or client radios. The links 114 of FIG. 1 can represent wireless links at a point in time, and it can be understood that wireless links 114 can be reconfigured as the various nodes 112 communicate with other nodes 112. For example, FIG. 1 illustrates a link 114 between node n4 and node n6. At another point in time, the communications between node n4 and node n6 can be completed and node n6 can establish a communication with node n7, as illustrated by dashed line 114a.

In such a network, router nodes can include a wireless router nodes that can intercept wireless transmissions on the network 100. Wireless router nodes can observe some (potentially very large) fraction of the wireless spectrum, and thus can observe transmissions from a wide range of wireless sender nodes 112. As illustrated by dashed line 120 shown in FIG. 1, wireless router nodes can have a limited effective reception range. Dashed line 120 can indicate an effective reception area through which router node n3 can receive communications from the nodes 112. Some nodes 112, such as nodes n6 and n7 in FIG. 1, can be out of the effective reception area and will not be monitored router node n3. Nodes n1-n5, which can be within the range illustrated by dashed line 120, can be monitored by router node n3.

For wireless nodes 112, node identity information observed by the router nodes can include, for example, an RF signature and/or the location of a radio transmitter node 112. For a wireless router node, e.g., n3, additional information can include the geographic location of the router node n3, as determined by, for example, a global positioning system (GPS) receiver. As previously described, although FIG. 1 illustrates a multiple router nodes n3-n6, network 100 can include one or more router nodes. For a wireless network, the number of router nodes placed in the network 100 can be determined by the desired coverage level of network 100. Wireless router nodes can have a globally synchronized clock that allows information from multiple router nodes to be combined.

In the presence of mobile nodes 112, e.g., in ad hoc wireless networks or Mobile IP, router nodes can include mobile router nodes, though stationary nodes can be utilized. Wireless router nodes can be placed randomly over a specified geographic area, or can be placed in a predetermined pattern. Alternately, wireless router nodes can be placed near respective sender nodes 112. Sender nodes 112 can move into or out of range of one or more wireless router nodes. Sender nodes 112 typically can dwell in the range of one or more router nodes long enough for transmission to be observed and the sources identified and recorded. For wireless sender nodes 112, the unique identifier can be based on the RF signature of the wireless sender node 112.

Figure 2:
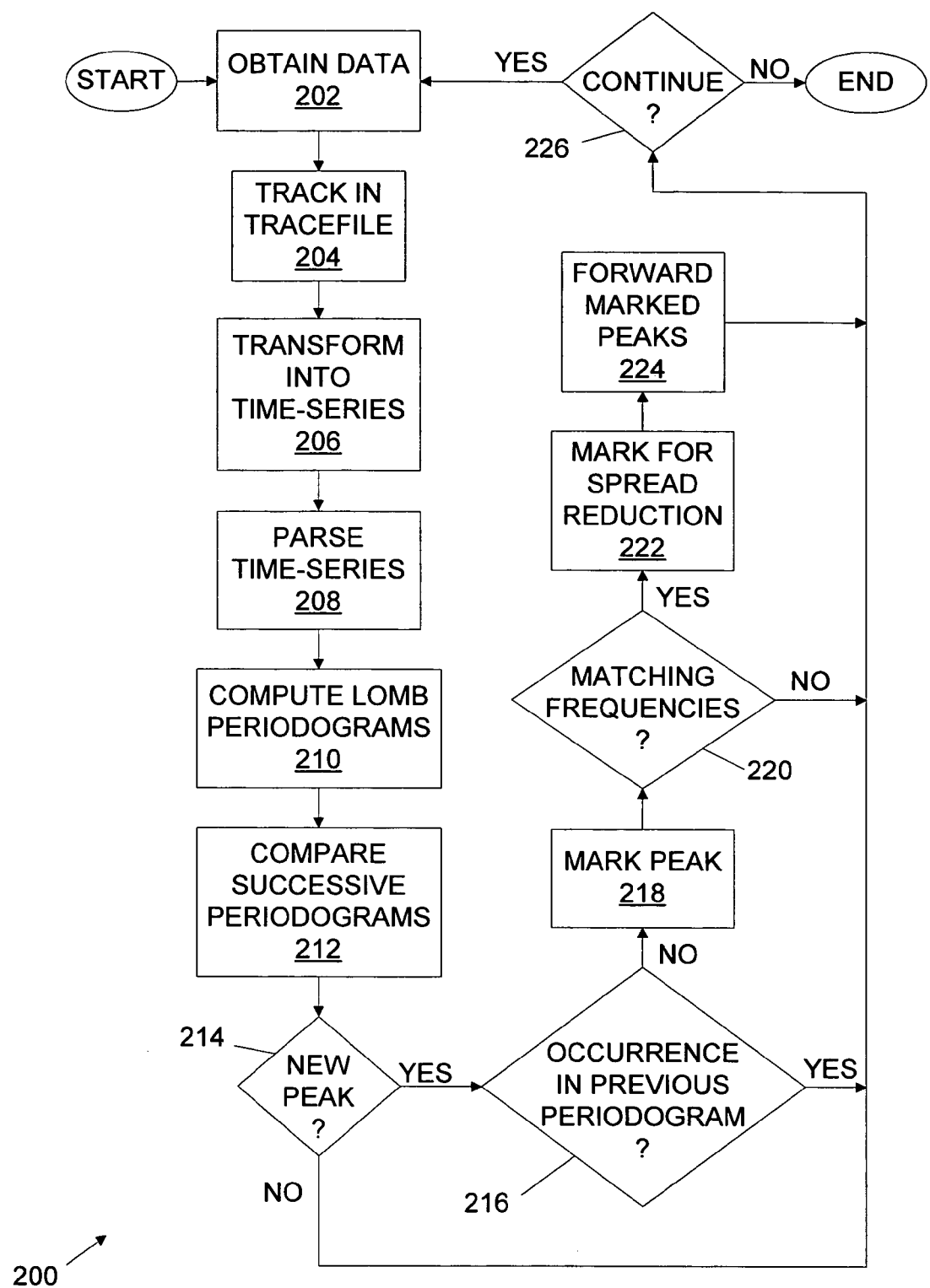
FIG. 2 illustrates a flow diagram of a method of determining files for which spread of the files on a network can be reduced.

Referring to FIG. 2, there is a flow chart of a method 200 that can track routing of traffic on a network, such as network 100 of FIG. 1. The method 200 can include identifying traffic frequency emanating from code and/or processor instructions executing on a network. The method can begin 202 by obtaining traffic flow data for the network 100 at one or more router nodes, as shown at nodes n3-n6 in FIG. 1. It can be understood that other known means of obtaining traffic flow data can be used and the implementation of method 200 need not be restricted to the use of router nodes n3-n6. For example, one or more taps can be provided that can determine when a chunk starts and ends. Such taps can include physical connections to corresponding links 114 and circuitry to detect chunks of data on the links 114. As in the case of router nodes n3-n6, the taps can include transceivers for sensing the chunks of data and can also include other circuitry (e.g., clock circuitry) for determining times of arrival and duration of the chunks. The taps can include processors for computing other information associated with the chunks, such as information contained within a header of the chunk of data.

Using the traffic flow data, method 200 can track (204), e.g., in a number of tracefiles, the time of arrival of packets at a router, or node 112, from the various sender nodes 112 seen by the router, with a sender node 112 having a corresponding tracefile. The tracefiles can be transformed (206) into a time-series. Those of skill in the art can appreciate that numerous methods can be employed to obtain a time-series from data, such as the traffic flow data in the above mentioned tracefile, including those described in detail in referenced U.S. patent application Ser. No. 10/212,324. In one embodiment for representing the time of arrival of chunks, a time quantization can be chosen, time can be "binned" and/or separated/grouped into time increments and/or intervals at that quantization and a marker can be placed in the bins that contain a detected chunk. A non-uniform signal can be represented as a non-uniformly-spaced sequence of impulses. The impulses can indicate leading edges of the discrete events in the tracefile for a router node, such as node n3 in FIG. 1.

In tracking file routing where the ingress-egress frequencies of the data stream are not known, e.g., in tracking worms that may enter the network, the time-series from 206 can be parsed (208) into discrete processing time windows and/or intervals of a predetermined duration, and/or size. The window size can depend on the characteristics of the network 100 and can be chosen to ensure that a window can include sufficient data for processing. As an example, a window size can taken as twice a round-trip time via a satellite link, 2*300 ms=600 ms. If a router node is on a 1 Gigabit/second link, the window size translates to 600 Megabits of memory for the window. Method 200 can compute 210 the Lomb Periodogram for a given window and/or source, and/or sender node 112. As known in the art, the Lomb technique provides a spectral analysis technique specifically designed for non-uniformly sampled data. Inherently, packet arrival times in computer networks, such as network 100 can be unevenly spaced, resulting in a non-uniformly sampled natural signal encoding. As described in further detail in referenced U.S. patent application Ser. No. 10/243,489, the Lomb technique can compute a periodogram by evaluating data only at the times for which a measurement is available.

Successive periodograms for the same source, or sender node 112, can be compared (212) with one another. Generally, the comparison can include obtaining a predetermined number (x) of strongest peaks of a periodogram, e.g., 10-100 peaks, and comparing them to the x strongest peaks of the previous periodogram. If a new peak is identified above a predetermined threshold, as determined at 214, it can be determined 216 if the identified peak occurred in one of a predetermined number of previous periodograms for the sender node. Generally, the number of previous periodograms can be chosen to provide an extended timeframe, e.g., in the range of seconds, during which the router can have experienced a full range of data types. As an example, the number of timeframes can depend on a network operator's requirements for false positives, with fewer false positives requiring the use of more timeframes. In one example, two timeframes can be used. In another example, the number of timeframes can be equal to the total available memory of the router node divided by the window size as described above.

If the identified peak has not occurred in one of the number of previous periodograms for the same sender node, the identified peak can be marked (218) for further analysis. If one or more marked peaks from other sender nodes 112, or from other router nodes in the network neighborhood have matching frequencies within nearby windows, as determined at 220, the peaks can be marked for spread reduction, as at 222. Generally, a nearby window can be the two or three windows, or timeframes, previous to the window in which a marked peak was identified, though other numbers of windows can be contemplated.

As shown in FIG. 2, the illustrated embodiment 200 can forward, at 224, the peaks marked for spread reduction to a process 300, which can reduce the spread of the packets identified corresponding to the marked peaks. Accordingly, the disclosed systems and methods 200 can provide for a continuous monitoring function that can obtain traffic flow data while the network is operable or active. Thus, the FIG. 2 method 200 can return to obtain additional data at 202 until monitoring is no longer desired, as determined at 226. Additionally, the FIG. 2 method 200 can return to obtain data at 202 via 226, if no new peaks are determined at 214, or if the new peaks have occurred in previous periodograms, as determined at 216, or if no peaks with matching frequencies are determined at 220.

Figure 3:
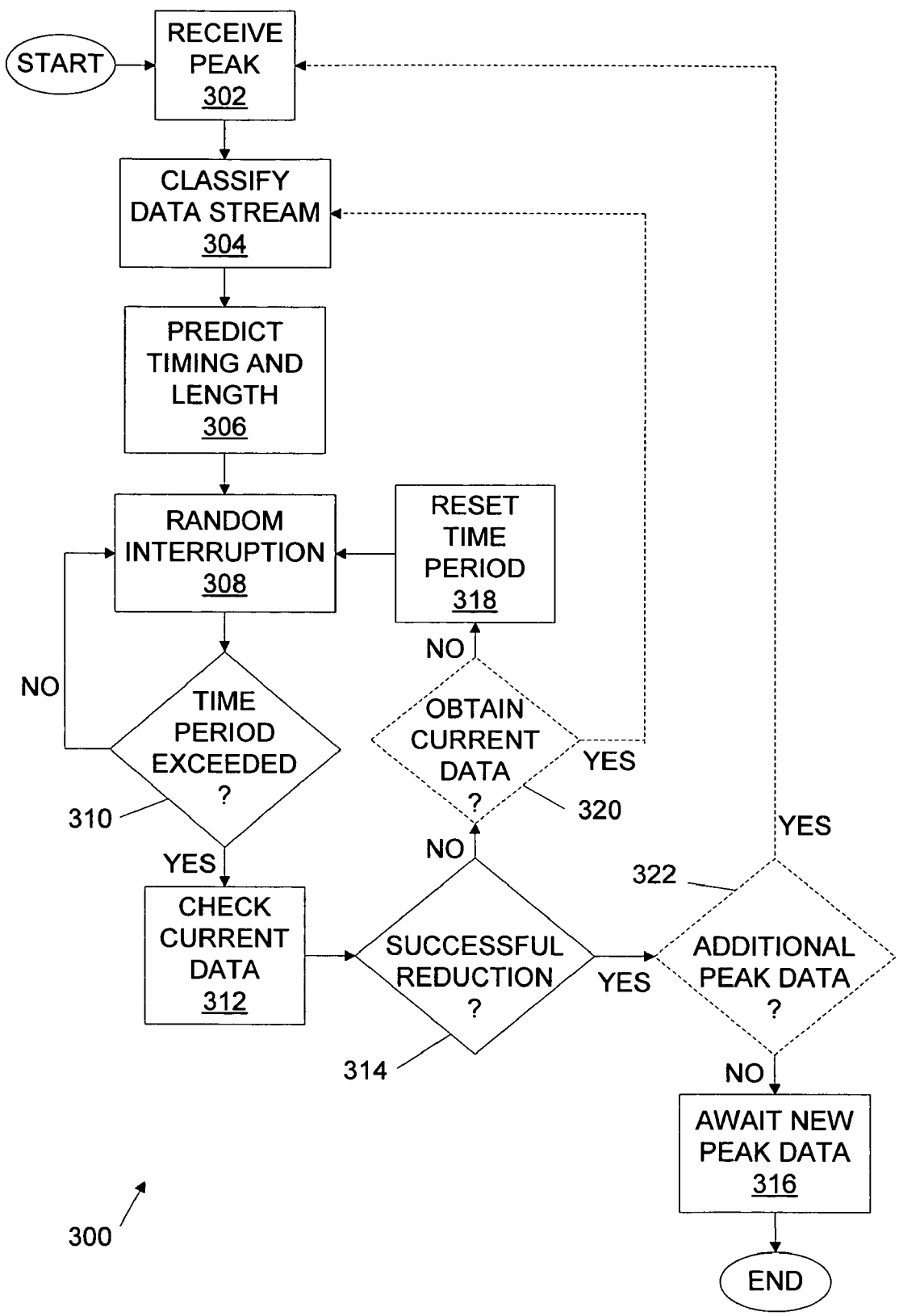
FIG. 3 illustrates a flow diagram of a method of reducing the spread of files on a network.

Referring now to FIG. 3, there is a flow chart of a method or process 300 that can reduce the spread of files on a network, such as network 100 of FIG. 1. Method 300 can begin when method 300 receives (302) a peak forwarded to method 300 by method 200 at 224 of FIG. 2. Based on the identified peak and the corresponding periodogram data, the data stream for the marked peak can be classified (304). Numerous algorithms can provide such classification, including algorithms using a Hidden Markov Model (HMM) approach and those incorporating a threshold-based cepstogram-bin approach. Such algorithms can serve to identify an unknown data flow, or data stream, as belonging to one of plurality of classifications of data flows whose characteristics can be determined.

The classification can allow for predictions to be made, as at 306, as to the timing and length of the next chunk transmission corresponding to the identified peak. Based on the predictions, method 300 can randomly interrupt transmission of packets (308) corresponding to the predicted timing and length. It can be understood that method 300 can continue random interruption of transmission for a period of time, as determined at 310. Depending on the classification approach, the time period can be a function of the predictions, or can be a predetermined time period.

If the time is exceeded, method 300 can check (312) current periodogram data to determine 314 if the transmission interruptions at 308 have succeeded in reducing the spread. If so, the method can end and await new peak data, as at 316. If not, the time period can be reset at 318 and method 300 can return to 308 to continue random interruptions of the transmission. In one embodiment, method 300 can return to 304 to reclassify the marked peak using current periodogram data, as indicated in phantom at 320. It can be understood that more than one peak can be marked for reduction and that multiple spread reduction processes 300 can operate in parallel. In one embodiment, spread reduction process 300 can cycle through the multiple peaks, as indicated in phantom at 322.

The systems and methods described herein can help to provide a robust network by reducing the spread of malicious or disruptive traffic on the network. The systems and methods can observe the frequency response of the traffic between the nodes of the network and can jam or interrupt unusual frequencies suspected to be generated by malicious traffic, such as traffic generated by a computer worm and/or other files or data streams that do not normally pervade the network traffic, that start suddenly and/or spread quickly. Analysis of the traffic flow data corresponding to the suspect frequencies can provide estimates for the timing and length of data packets corresponding to those frequencies and data packets can be dropped based on the estimates.

In addition, the techniques described herein can be implemented in hardware or software, or a combination thereof. The systems and methods can be implemented in one or more computer programs executing on one or more programmable computers, such as may be exemplified by nodes 112 and/or the previously described taps, among others, that include a processor, a storage medium readable by the processor (including volatile and non-volatile memory and/or storage elements), one or more input devices, and one or more output devices.

The computer programs, or programs, may be preferably implemented using one or more high level procedural or object-oriented programming languages to communicate with a computer system; however, the program(s) can be implemented in assembly or machine language, if desired. The language can be compiled or interpreted. The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

While the method and systems have been disclosed in connection with the preferred embodiments shown and described in detail, various modifications and improvements thereon will become readily apparent to those skilled in the art. As an example, those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods. Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A method of reducing spread of data on a network, comprising:
   obtaining a spectral analysis of times of arrival of data packets at receiving nodes of said network from sending nodes of said network over predetermined time periods;
   for each pair of sending node and receiving node, marking transmissions of data packets for said pair as marked transmissions when said spectral analysis indicates peak frequencies associated with said marked transmissions are different from peak frequencies associated with others of said transmissions for said pair over a window of a predetermined number of said time periods;
   marking transmissions of data packets as interruptible transmissions when marked transmissions from pairs having at least one of a common sending node and a common receiving node and within a specified number of said windows have corresponding frequencies;
   estimating timing and length information for future data packets corresponding to said interruptible transmissions; and
   interrupting traffic of said future data packets based on said estimating.

2. The method of claim 1, wherein obtaining a spectral analysis comprises:
   tracking times of arrival data;
   transforming said times of arrival data into time-series;
   parsing said time-series into said windows; and
   obtaining Lomb periodograms for said windows.

3. The method of claim 1, wherein estimating comprises applying a Hidden Markov Model technique for classifying said interruptible transmissions as belonging to one of a plurality of classes of transmissions having determinable characteristics.

4. The method of claim 1, wherein interrupting comprises randomly removing data packets.

5. The method of claim 4, comprising:
   interrupting for a specified time; and
   determining, after said specified time, if a further spectral analysis of times of arrival of data packets since beginning said interrupting indicates said peak frequencies associated with said marked transmissions.

6. The method of claim 5, comprising returning to estimating based on said further spectral analysis when said further spectral analysis indicates said peak frequencies associated with said marked transmissions.

7. The method of claim 4, wherein obtaining a spectral analysis comprises:
   tracking times of arrival data;
   transforming said times of arrival data into time-series;
   parsing said time-series into said windows; and
   obtaining Lomb periodograms for said windows.

8. A method of reducing spread of data on a network, comprising:
   obtaining, at a receiver node of said network, periodograms based on times of arrival of data packets from a sender node of said network;
   comparing peak frequencies in successive ones of said periodograms for said sender node to determine if one of said periodograms includes a peak above a threshold at a frequency different from said peak frequencies in a preceding one of said periodograms;
   determining if at least one peak above said threshold at said frequency occurs in one of a predetermined number of previous periodograms for said sender node;
   determining if said at least one peak at said frequency occurs in at least one of a specified number of periodograms obtained at said receiver node for other sender nodes of said network;
   estimating timing and length information for future data packets corresponding to said frequency when said at least one peak at said frequency does not occur in one of said predetermined number of previous periodograms for said sender node and when said at least one peak at said frequency occurs in at least one of said specified number of periodograms obtained at said receiver node for other sender nodes of said network; and interrupting traffic of said future data packets corresponding to said frequency based on said estimating.

9. The method of claim 8, wherein obtaining said periodograms comprises:
tracking times of arrival data;
transforming said times of arrival data into time-series;
parsing said time-series into windows; and
obtaining Lomb periodograms for said windows.

10. The method of claim 8, wherein said estimating comprises classifying a data stream for said at least one peak at said frequency based on said periodograms using a Hidden Markov Model.

11. The method of claim 8, wherein interrupting comprises:
randomly removing data packets for a specified time;
determining, after said specified time, if said at least one peak at said frequency occurs in at least one additional periodogram based on times of arrival of data packets since beginning said interrupting; and
returning to estimating based on including said additional periodograms with said specified number of periodograms when said at least one peak at said frequency occurs in said at least one additional periodogram.

12. A method of reducing spread of data on a network, comprising:
obtaining, at a router node of said network, periodograms based on times of arrival of data packets from a sender node of said network;
comparing successive periodograms for said sender node to determine when at least one new peak above a threshold is present in one of said periodograms;
determining if said at least one new peak occurs in one of a predetermined number of previous periodograms for said sender node;
determining if said at least one new peak occurs in at least one of a specified number of periodograms obtained at said router node for other sender nodes of said network;
estimating timing and length information for future data packets corresponding to said at least one new peak when said at least one new peak does not occur in one of a predetermined number of previous periodograms for said sender node and when said at least one new peak occurs in at least one of said specified number of periodograms obtained at said router node for other sender nodes of said network; and
interrupting traffic of said data packets corresponding to said at least one new peak based on said estimating.

13. The method of claim 12, wherein interrupting comprises randomly removing data packets for a specified time.

14. The method of claim 13, wherein obtaining said periodograms comprises:
tracking times of arrival data;
transforming said times of arrival data into time-series;
parsing said time-series into windows; and
obtaining Lomb periodograms for said windows.

15. The method of claim 14, wherein said estimating comprises classifying a data stream for said at least one new peak based on said periodograms using a Hidden Markov Model.

16. A computer program, disposed on a computer-readable medium, for reducing spread of data on a network, said computer program including instructions for causing a processor to:
obtain a spectral analysis of times of arrival of data packets at receiving nodes of said network from sending nodes of said network over predetermined time periods;
for each pair of sending node and receiving node, mark transmissions of data packets for said pair as marked transmissions when said spectral analysis indicates peak frequencies associated with said marked transmissions are different from peak frequencies associated with others of said transmissions for said pair over a window of a predetermined number of said time periods;
mark transmissions of data packets as interruptible transmissions when marked transmissions from pairs having at least one of a common sending node and a common receiving node and within a specified number of said windows have corresponding frequencies;
estimate timing and length information for future data packets corresponding to said interruptible transmissions; and
interrupt traffic of said future data packets based on said estimating.

17. The computer program of claim 16, wherein said instructions to obtain a spectral analysis comprise instructions to:
track times of arrival data;
transform said times of arrival data into time-series;
parse said time-series into said windows; and
obtain Lomb periodograms for said windows.

18. The computer program of claim 16, wherein said instructions to estimate comprise instructions to apply a Hidden Markov Model technique to classify said interruptible transmissions as belonging to one of a plurality of classes of transmissions having determinable characteristics.

19. The computer program of claim 16, wherein said instructions to interrupt comprise instructions to randomly remove data packets.

20. The computer program of claim 19, wherein said instructions to interrupt further comprise instructions to:
interrupt for a specified time; and
determine, after said specified time, if a further spectral analysis of times of arrival of data packets since beginning to interrupt indicates said peak frequencies associated with said marked transmissions.

21. The computer program of claim 20, wherein said instructions to interrupt further comprise instructions to repeat said instructions to estimate based on said further spectral analysis when said further spectral analysis indicates said peak frequencies associated with said marked transmissions.

* * * * *